US007936278B2

(12) United States Patent
Ahn et al.

(10) Patent No.: US 7,936,278 B2
(45) Date of Patent: May 3, 2011

(54) PORTABLE ELECTRONIC DEVICE AND CAMERA

(75) Inventors: Kyoung-jin Ahn, Suwon-si (KR); Yo-han Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 11/594,795

(22) Filed: Nov. 9, 2006

(65) Prior Publication Data

US 2007/0273786 A1 Nov. 29, 2007

(30) Foreign Application Priority Data

May 26, 2006 (KR) .......................... 10-2006-0047638

(51) Int. Cl.
*G08B 23/00* (2006.01)
(52) U.S. Cl. ............... 340/693.5; 340/693.7; 340/545.6; 340/546; 348/373; 455/347; 455/575.1
(58) Field of Classification Search ............... 340/693.5, 340/693.7, 693.9, 545.6, 546; 348/373; 396/448, 396/535, 538; 455/90.1, 90.3, 347, 575.1, 455/575.4
See application file for complete search history.

(56) References Cited

U.S. PATENT DOCUMENTS

| | | | |
|---|---|---|---|
| 6,246,835 B1 * | 6/2001 | Manabe ........................ | 396/177 |
| 6,322,259 B1 | 11/2001 | Miyamoto et al. | |
| 7,519,404 B2 * | 4/2009 | Lonka et al. ............... | 455/575.4 |
| 2004/0204202 A1 * | 10/2004 | Shimamura et al. ....... | 455/575.1 |
| 2005/0009581 A1 * | 1/2005 | Im et al. ..................... | 455/575.4 |
| 2006/0135228 A1 * | 6/2006 | Kato .......................... | 455/575.4 |

FOREIGN PATENT DOCUMENTS

| | | |
|---|---|---|
| EP | 0 892 447 A1 | 1/1999 |
| EP | 1 594 293 A2 | 11/2005 |
| EP | 1 594 293 A3 | 1/2006 |
| JP | 10-104712 | 4/1998 |
| JP | 2004-297301 | 10/2004 |
| KR | 1020060031222 | 4/2006 |

* cited by examiner

*Primary Examiner* — Hung T. Nguyen
(74) *Attorney, Agent, or Firm* — Roylance, Abrams, Berdo and Goodman, LLP

(57) ABSTRACT

A portable electronic device is provided, including a first body, which has a display screen, a second body, which is slidably connected to the first body, and a door unit, which opens and closes a battery compartment disposed between the first and second bodies, in which the door unit is concealed and made externally visible according to the position of the second body relative to the first body, and in which the door unit can be opened and closed when it is externally visible.

24 Claims, 12 Drawing Sheets

PORTABLE ELECTRONIC DEVICE AND CAMERA

CROSS-REFERENCE TO RELATED APPLICATIONS

This application claims the benefit under 35 U.S.C. §119(a) of Korean Patent Application No. 10-2006-0047638, filed in the Korean Intellectual Property Office on May 26, 2006, the entire disclosure of which is incorporated herein by reference.

BACKGROUND OF THE INVENTION

1. Field of the Invention

The present invention relates to a portable electronic device with a camera. More specifically, the present invention relates to a multi-function portable electronic device with a camera having a plurality of functions including static and moving image capture, audio capture, MP3 playback, Digital Multimedia Broadcasting (DMB) and web camera functions.

2. Description of the Related Art

Multi-function digital cameras combining static image and moving image capture functions with audio capture, MP3 playback, and web camera functions have been developed recently, and products which can receive Digital Multimedia Broadcasting are expected to appear on the market soon.

Such complex multi-function digital cameras can have a wide range of functions, but there is demand for a camera which, while being compact and practical to use, also has a large display screen and additional functions such as Digital Multimedia Broadcasting.

Additionally, multi-function digital cameras and similar portable electronic devices need a plurality of operating buttons to select and operate the range of functions available.

Conventional multi-function digital cameras with a display screen and a plurality of operating buttons on a single body, as described above, cannot be constructed having both a display screen as large as consumers desire and an overall size as small as consumers wish. Moreover, since it is also necessary to have a grip unit to be able to hold the camera, the display screen is further limited in its size. That is, although conventional multi-function digital cameras are not large, there is a demand for a product which has a larger display, while still being able to be held easily and having numerous and advanced functions, such as Digital Media Broadcasting.

Also, portable electronic devices combining a diverse range of functions require batteries which have a high level of performance, and this performance is closely related to the size of the batteries. Therefore, while reducing the overall size of the portable electronic device and increasing the capacity of the batteries, it is also important to reduce the space and structural complexity needed in order to store and/or remove the batteries, and to reduce the size and improve the design of the product.

Accordingly, a need exists for a system and method for providing a portable electronic device including desired features and functions while having an optimum size and improved design.

SUMMARY OF THE INVENTION

One object of embodiments of the present invention is to substantially solve the above and other problems, and provide a convenient and portable electronic device with a camera having a large display screen, but being easy to hold and having an overall size that is not too large, taking into consideration the points described above.

Another object of embodiments of the present invention is to provide a portable electronic device with a camera in which the battery can be easily removed, without having a significant effect on the size of the product.

A further object of embodiments of the present invention is to provide a portable electronic device with a camera having a first body, which contains a display screen that is relatively large in proportion to the body, while reducing the overall size of the camera, a second body, which moves in a sliding fashion along the first body, and a structure that covers the gap which arises between the first and second bodies.

An exemplary portable electronic device designed in order to achieve these and other objects of embodiments of the present invention comprises a first body, which has a display screen, a second body, which is attached slidably to the first body, and a door unit, which opens and closes the battery compartment provided between the first and second bodies. The door unit may be visible or concealed depending on the position of the second body in its sliding movement along the first body.

The battery compartment and door unit may be attached to the first body and may move together with the first body.

The door unit may be partially concealed by the second body when the second body moves in a sliding motion relative to the first body.

The first body may additionally comprise a lens, which is concealed or visible depending on the position of the second body relative to the first body.

The door unit is disposed around the entrance of the battery compartment, and may comprise a door frame, which has a battery port through which the battery passes, a door member, which is installed on the door frame so as to be able to swing open and shut, and which opens and closes the battery port, and a locking unit, which is disposed on the door frame in order to lock the door member when the door member is closed.

The door unit may further comprise a spring, which enables the door member to open automatically when the locking mechanism is released.

The door locking unit is movably installed on the door frame, and comprises a locking knob, which attaches to the door member when the door member is closed, a pressurized spring, which presses the locking knob against the door member, and a support bracket, which is installed on the door frame and movably supports the pressurized spring and the locking knob.

The door member may also comprise a first section which remains externally visible, and a second section, which may be concealed or visible depending on the position of the second body relative to the first body. The second section may be thinner than the first section.

Moreover, the second section may be formed having an indented, stepped and/or recessed profile relative to the main surface on the outside of the first body. Further, one side of the second section may be formed having a hole, indent or recess so that a user can easily operate the door locking unit of the door member with his or her finger.

Additionally, the first section may have a height corresponding to the height of the outer surface covering the second section of the second body.

The door unit may further comprise a battery locking unit, which prevents the batteries inserted in the battery compartment from falling out. The battery locking unit is movably installed on the door frame, and comprises a battery locking knob, which may cover the battery entrance depending on the position of the second body relative to the first body, and which prevents the batteries from falling out, and a pressurized spring, which presses the battery locking knob into the battery port.

The battery locking unit may further comprise an operating member, which slidably supports the battery locking knob on the door frame, and a support piece, which prevents the pressurized springs from falling off the door frame.

The battery locking unit may be opened or concealed by the door member.

A recording medium mount unit may also be disposed between the first and second bodies, which may be opened and closed on the door frame by the door member. A recording medium entrance may also be disposed between the first and second bodies, through which the recording medium can be inserted or removed from the recording medium mount unit.

The door unit may further comprise a curtain unit in order to cover the gap that arises between the first body and the concealed section when the section that was previously concealed by the second body of the door unit becomes externally visible. The curtain unit comprises a curtain member slidably installed between the first body and the door unit, and a curtain spring, which moves the curtain member to the position in which it conceals the gap that arises when the previously concealed section of the door unit is exposed. The curtain member may be pushed over the second body in order to cover the concealed section, and then moved back to the initial position.

The curtain member may be supported by a sliding mechanism in order to move back and forth over the door unit.

The door unit may further comprise a slide unit, connected to the first body, which enables the second body to move in a sliding motion, and which contains the battery compartment. The slide unit may comprise a first sliding member, which is attached to the first body, and a second sliding member, which is attached to the second body and is slidably attached to the first sliding member. The battery compartment may be disposed on the first sliding member.

Also, a lens may be disposed on the first body, and a plurality of operating buttons may be disposed on the second body. The lens and operating buttons may be disposed so as to be concealed or externally visible when the second body moves in a sliding motion along the first body.

An exemplary camera designed in order to achieve these and other objects of embodiments of the present invention comprises a door unit, which is partially concealed or externally visible according to the position of the second body, and which is attached so as to move in a sliding motion back and forth along the first body, containing a display screen and lens.

Another exemplary portable electronic device according to other objects of the present invention comprises a first body, which has a screen and a battery compartment, a second body, which is attached to the first body so as to be able to slide back and forth along the first body, and a door unit, which is installed on the first body so as to open and close the battery compartment, and which determines whether to open the battery compartment or not according to the position of the first body relative to the second body.

Another exemplary portable electronic device according to other objects of the present invention comprises a first body, a second body, which is slidably attached to the first body, and a door unit, which is disposed between the first and second bodies. The door unit is made to open or close depending on the position of the first body relative to the second body.

Another exemplary portable electronic device according to yet other objects of the present invention comprises a first body, which has a display screen and a lens, a second body, which is slidably attached to the first body, and a door unit, which opens and shuts the battery compartment disposed between the first and second bodies. The door unit is made to open and close depending on the relative position of the first and second bodies.

BRIEF DESCRIPTION OF THE DRAWINGS

The above aspects and features of embodiments of the present invention will become more apparent by describing certain exemplary embodiments of the present invention with reference to the accompanying drawings, in which.

Throughout the drawings, like reference numerals will be understood to refer to like parts, components and structures.

DESCRIPTION OF EXEMPLARY EMBODIMENTS

Figure 1A:
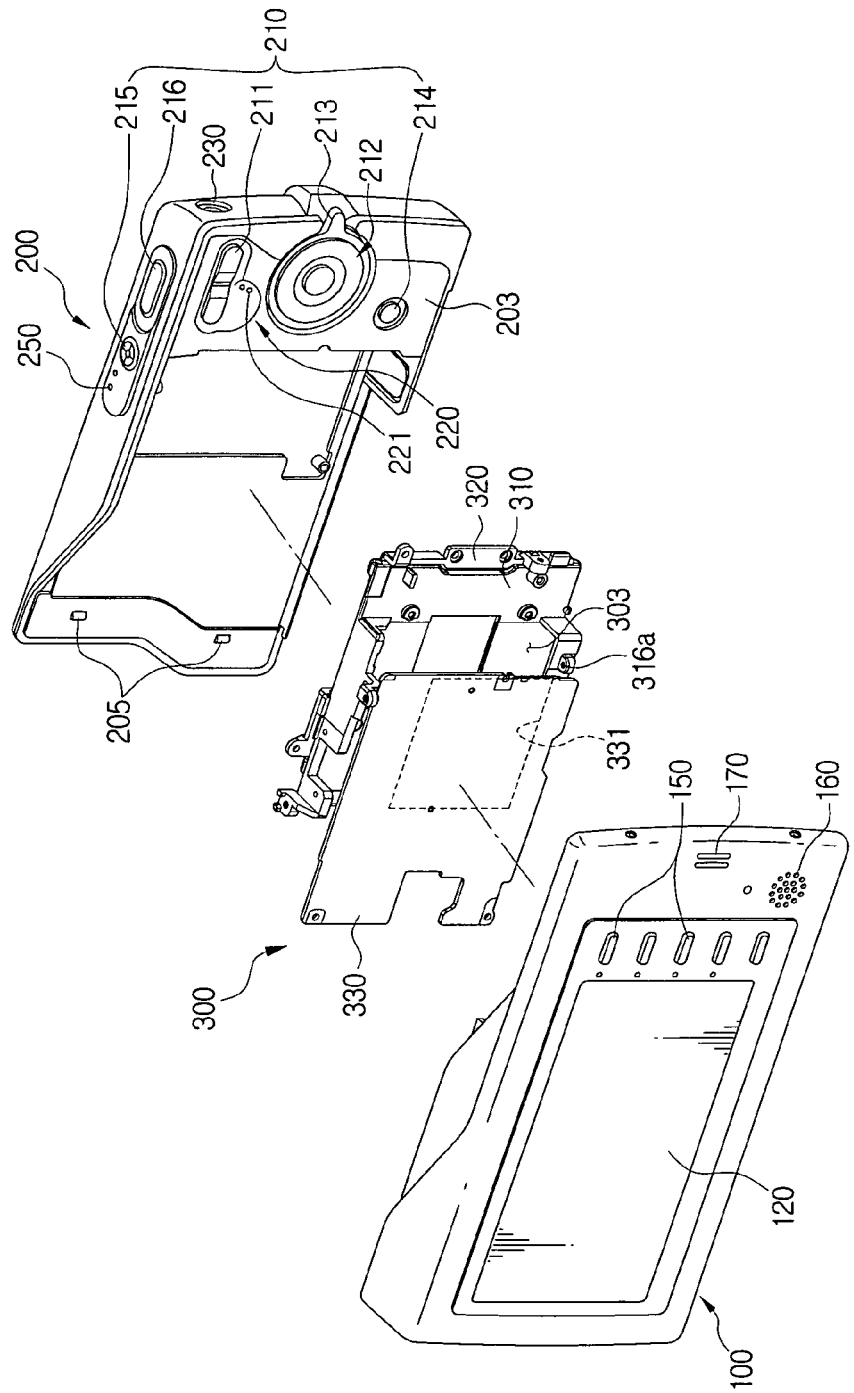
FIGS. 1A and 1B are perspective views of a camera according to exemplary embodiments of the present invention in a dissembled state.

Below, exemplary embodiments of the present invention are described with reference to the attached drawings.

The portable electronic device according to embodiments of the present invention, shown in FIGS. 1 to 3, is offered as an example of a camera which has the primary function of capturing still and moving images, but has additional functions, including, but not limited to, sound recording, MP3 playback, Digital Multimedia Broadcasting and web camera functions.

A camera according to an exemplary embodiment of the present invention, as illustrated in FIGS. 1A to 3B comprises a first body 100 and a second body 200. The first body 100 and the second body 200 are designed to side relative to each other from a first position to a second position. The first body 100 comprises a lens 110 (referring to FIG. 1B) and a display screen 120, and the second body 200 comprises a plurality of operating buttons 210.

Figure 2A:
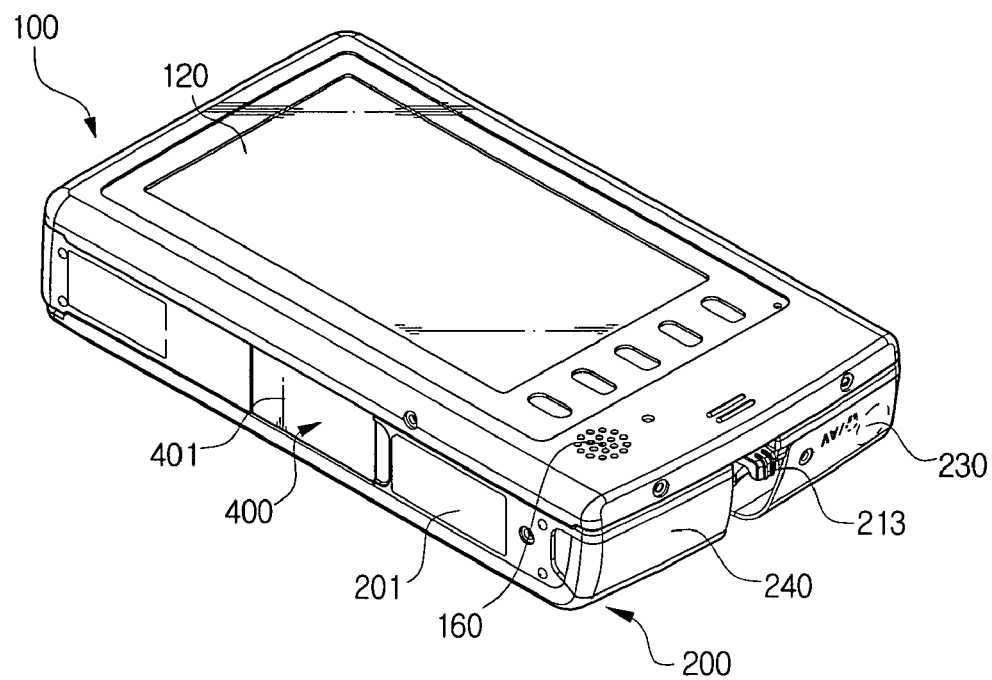
FIGS. 2A and 2B are perspective views of a camera according to an exemplary embodiment of the present invention.
Figure 2B:
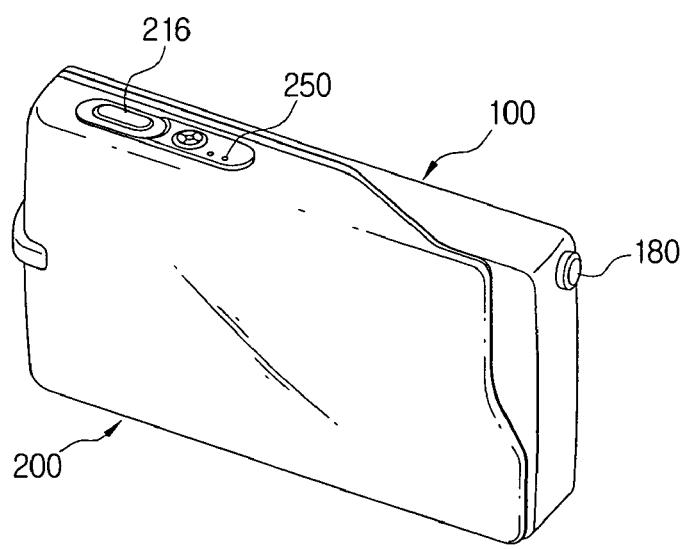
Figure 3A:
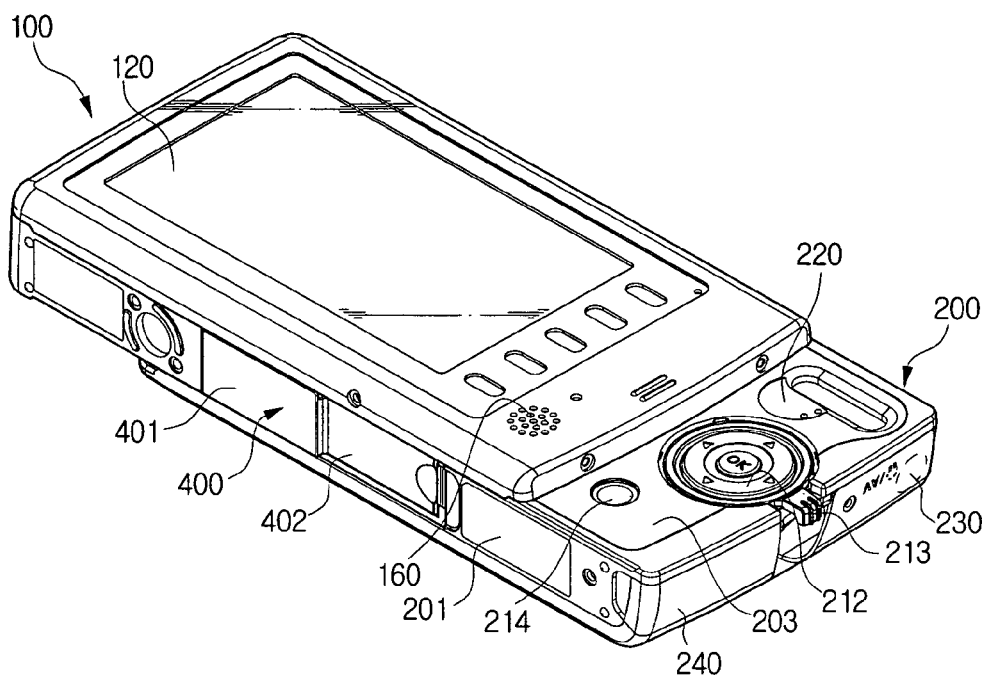
FIGS. 3A and 3B are perspective views illustrating a state in which the second body moves in a sliding motion along the first body in a camera according to exemplary embodiments of the present invention.
Figure 3B:
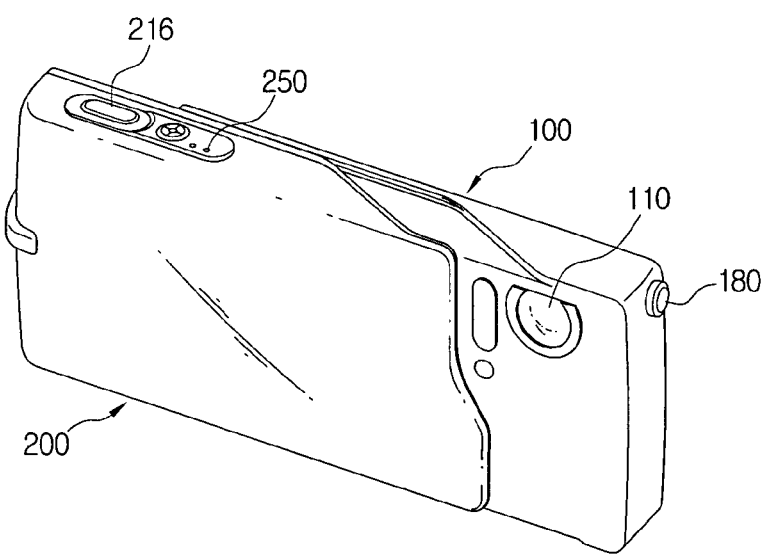

The exemplary camera according to embodiments of the present invention also comprises a slide unit 300 which enables the second body 200 to slide from the first position to the second position relative to the first body 100. The first position, as shown in FIGS. 2A and 2B, is a position in which the lens 110 of the first body 100 and the operating buttons 210 of the second body 200 are concealed, and the second position, shown in FIGS. 3A and 3B, is a position in which the lens 110 of the first body 100 and the operating buttons 210 of the second body 200 are externally visible.

Figure 4:
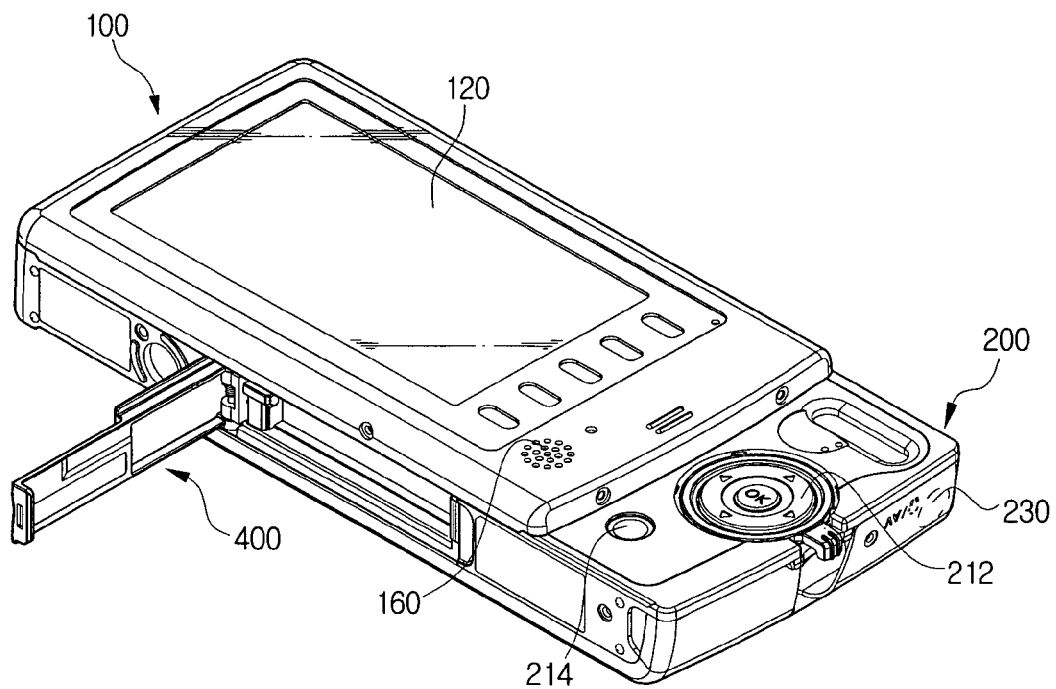
FIG. 4 is a perspective view illustrating a state in which the battery door unit shown in FIG. 3A is open according to exemplary embodiments of the present invention.

Specifically, the first position is a position in which the concealed section (hereinafter referred to as the second section 402) of the door unit 400 is concealed by the second body 200, and the second position, shown in FIG. 4, is a position in which the second section 402 of the door unit 400 is made externally visible by the movement of the second body 200. The door unit 400 may be opened and closed when the first and second bodies are in the second position.

The lens 110 and operating buttons 210 are made externally visible, and still images and moving images can be captured, by sliding the first body 100 and the second body 200 to the second position as described above. After capturing the images, the first body 100 and the second body 200 can be moved back to the first position, so that the lens 110 and the operating buttons 210 are concealed and protected. Other functions, in addition to the basic functions of capturing still and moving images, may also be performed when the first body 100 and the second body 200 are moved to the second position.

Moreover, by moving the first body 100 and the second body 200 to the second position, the door unit 400 can be opened and the batteries and recording media can be inserted into or removed from the battery compartment 303 and the recording media mount unit 331, respectively. Also, by sliding the first body 100 and the second body 200 to the first position and concealing the second section 402 of the door unit 400, the door unit 400 can be prevented from opening and closing and the batteries and recording media cannot be changed.

The lens 110 is installed on one side of the front of the first body 100, and an LCD screen or similar display screen 120 is installed on the rear of the first body 100. Because components other than the display screen 120, such as operating buttons, are not generally installed at this position, and a grip function is generally not provided on the first body 100, it is possible to have a large display screen 120. A conventional camera comprises a single camera body corresponding to the first body of the present invention. By providing not only a display screen and a plurality of operating buttons, but also a grip function on the body of the camera, it is difficult to increase the size of the display screen. By disposing operating buttons 210 and a grip unit on the second body 200, separately from the display screen, the overall size of the camera is not increased by embodiments of the present invention, but a larger display screen can be used.

Moreover, by providing a door unit 400 which can be concealed or made externally visible by the sliding movement of the first body 100 and the second body 200, the display screen 120 of the first body 100 and the overall size of the first body 100 are not affected, and a battery can be used which is as large as the space within the camera allows.

Additionally, as the door unit 400 is partially concealed or made externally visible by the sliding movement of the first and second bodies 100 and 200, the first and second bodies 100 and 200 can be designed so as to move freely.

A STROBO 130 and a light-emitting diode (LED) 140 can also be installed on the front of the first body 100, and components such as a plurality of function keys 150 for navigating the menu, speakers 160, and a push unit, which is pushed by hand in order to move the first body 100, can be provided in appropriate positions. Slide prevention projections 170 can also be disposed on the push unit.

An antenna 180 (in FIG. 2B) can be disposed on one side of the first body 100, and circuitboard components 330 can be installed on the inside of the first body 100.

The second body 200 comprises a holding unit 203, which is externally visible when the second body 200 slides to the second position. A holding cavity 220 is formed on the holding unit 203 to accommodate the thumb of the user, and a projection 221 is formed in the holding cavity 220 to prevent sliding. The plurality of operating buttons 210 may include a zoom button 211, a direction button 212, a mode switch knob 213, a menu button 214, a power button 215 and a shutter 216.

The zoom button 211, direction button 212, mode switch knob 213 and menu button 214 can be disposed on the holding unit 203, and the power button 215 and shutter 216 can be disposed on the top of the second body 200. In addition, an AV headset jack 230 can be disposed on the top of one side of the second body 200, and a direct current (DC) jack, universal serial bus (USB) jack, and other jacks can be disposed at the bottom of one side of the second body 200. The direct current and universal serial bus jacks are concealed by the cover 240 and are only made externally visible at the time of use.

The mode switch knob 213 can be disposed in a ring formation around the direction button 212. By disposing a mode switch knob in this manner, the space of the second body 200 can be utilized more efficiently. A microphone 250 can also be disposed on the second body 200.

Figure 1B:
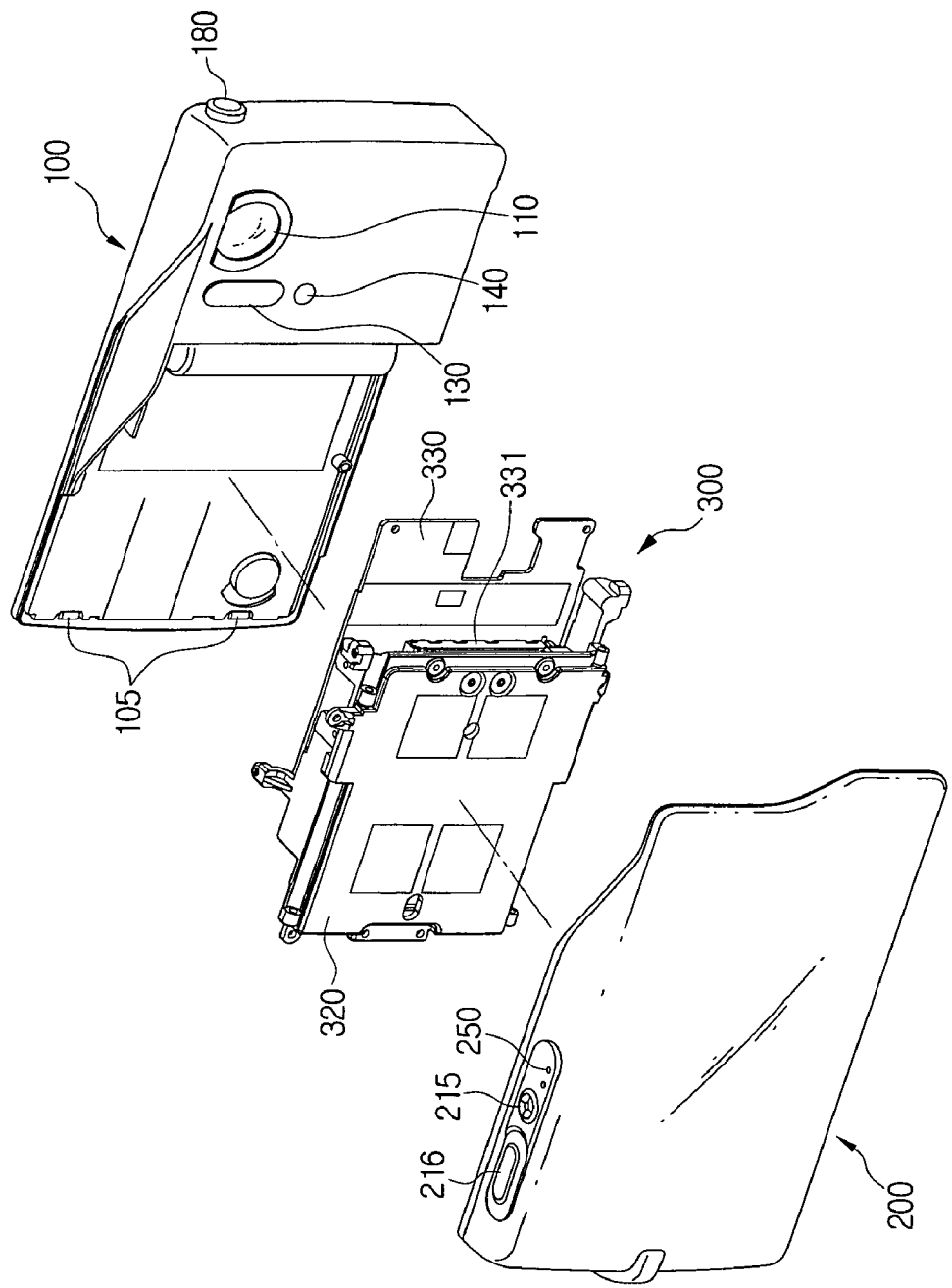

Guide rollers 105 and 205 are disposed on the contact surface between the first body 100 and the second body 200 in order to form a smooth sliding surface and prevent scratching on the contact area. As shown in FIGS. 1A and 1B, a pair of first guide rollers 105 are installed on the first body 100 in contact with the holding unit 203 of the second body 200, and a pair of second guide rollers 205 are installed on the second body in contact with the installation surface of the lens 110 on the first body 100.

The sliding unit shown in FIGS. 1A, 1B, 5A, 5B and 5C, comprises a first sliding member 310 attached to the first body 100, and a second sliding member 320 attached to the second body 200. The first and second sliding members 310 and 320 are slidably connected by a guide shaft 301.

One side of the first sliding member 310 contacts and blocks the second sliding member 320, and the other side faces the circuit board 330 at a predetermined distance. Between the first sliding member 310 and the circuit board 330 a space is formed, and this space is used as a battery compartment 303 in which the batteries 500 are inserted. In order to achieve this, the first sliding member 310 comprises a left wall 311 and a right wall 312 which support the batteries 500, and a rear wall 313. The battery compartment 303 is formed in the space between the circuit board 330, the left and right walls 311 and 312, and the rear wall 313.

A visibility hole 313a is formed on the rear wall 313 of the first sliding member 310 so that the terminal unit of the battery 500 can be made externally visible. A shaft support unit 314 is disposed on the first sliding member 310, and is attached to the shaft 301. Also, a plurality of first fastening units 315a and 315b, which fasten the first sliding member 310 to the first body 100, and a plurality of second fastening units 316a and 316b which fasten the first sliding member 310 to the door unit 400, are provided on the first sliding member 310. The second fastening units 316a and 316b have screw holes in order to be fastened to the door frame 410 of the door unit 400 described above.

The second sliding member 320 is placed on the shaft 301 and is slidably connected to the first sliding member 310. The second sliding member 320 has a plate form, and has a plurality of fastening units 321 and 322 which fasten the second sliding member 320 to the second body 200. Additionally, the second sliding member 320 has a first guide shaft unit 323 and a second guide shaft unit 324 which are inserted into and guided by the shaft 301.

The battery compartment 303 described above is provided in the space between the first sliding member 310 and the circuit board 330. Consequently, there is no need for a space to be set aside for accommodating the battery in the first body 100 or the second body 200. The entrance to the battery compartment 303 can be opened and closed by the door unit 400 as shown in FIGS. 4, 5B, 5C and 5D.

Figure 5A:
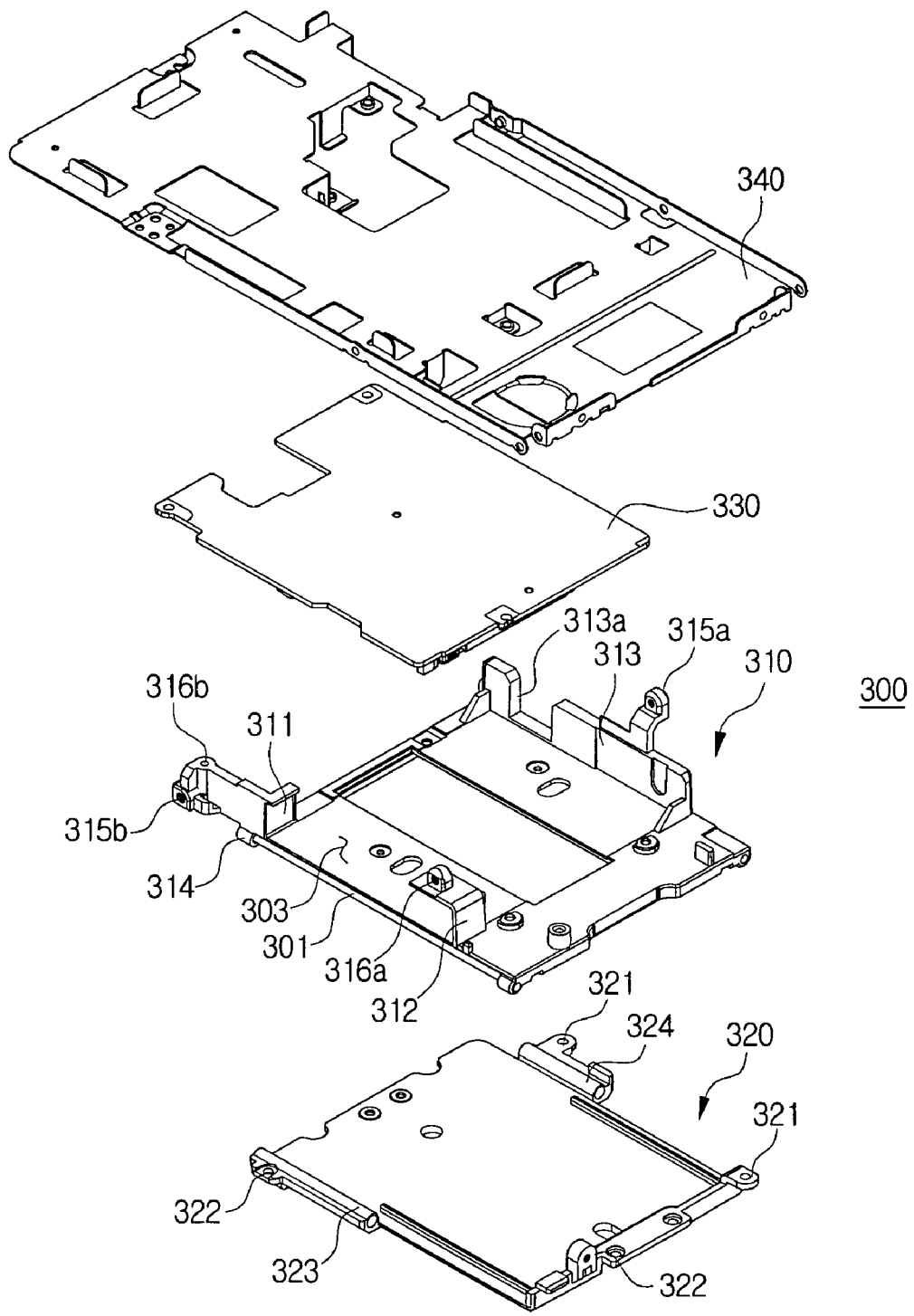
FIG. 5A is a perspective view of a sliding unit shown in FIGS. 1A and 1B in a dissembled state according to exemplary embodiments of the present invention.
Figure 5B:
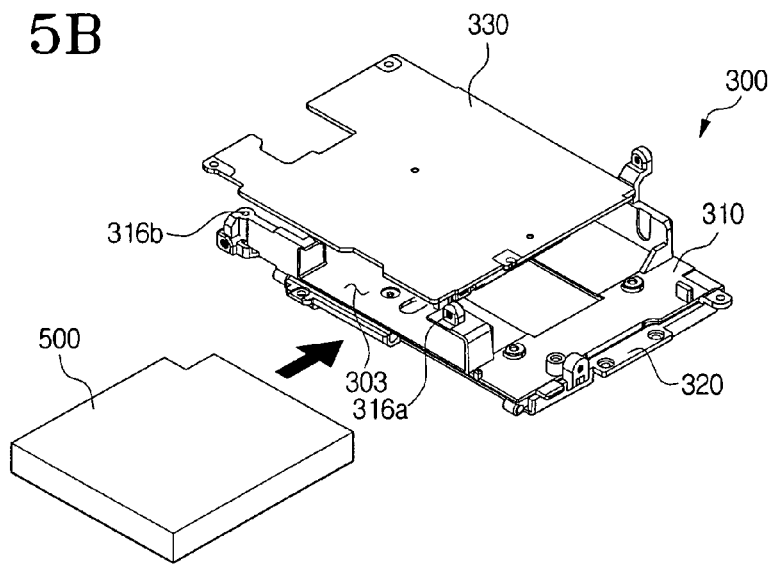
FIGS. 5B and 5C are perspective views illustrating a state in which the sliding unit shown in FIG. 5A is attached according to exemplary embodiments of the present invention.
Figure 5C:
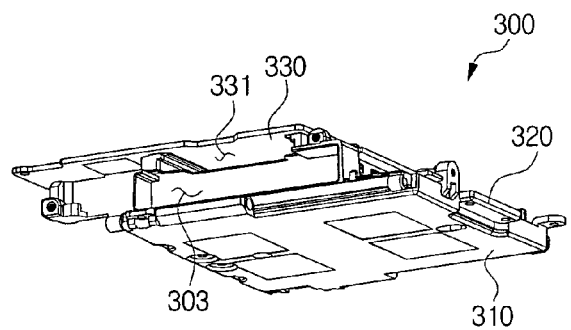
Figure 5D:
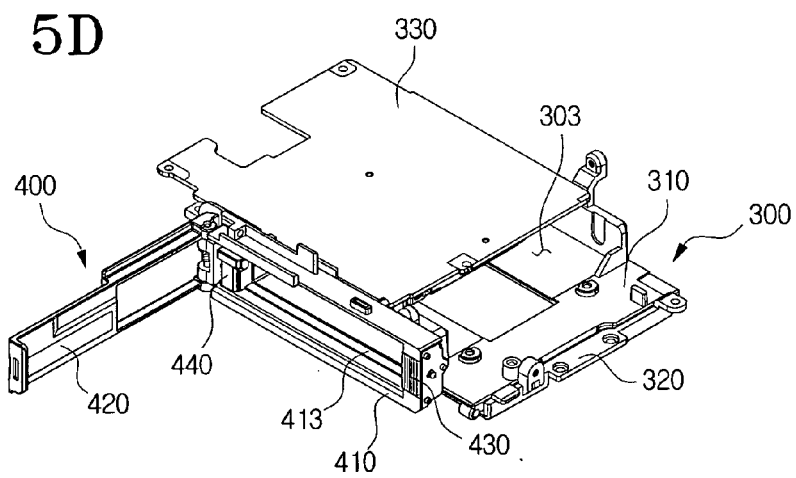
FIG. 5D is a perspective view illustrating a door unit attached to the sliding unit shown in FIG. 5B according to exemplary embodiments of the present invention.

Also, as shown in FIG. 5C, a recording medium mount unit 331 is provided on the circuit board 330 to mount a memory stick or a similar recording medium. The recording medium mount unit 331 is disposed next to the battery compartment 303, and the recording medium mount unit 330 is aligned with the battery compartment 303. Therefore, the recording medium mount unit 331 can also be opened and closed by the door unit 400. The circuit board 330 is attached to the support frame 340, which is fastened on the inside of the first body 100. The support frame 340 provides support from the inside for the outer casing of the first body 100, which is generally made of plastic.

The door unit 400, as shown in FIGS. 2A and 3A, has a section which may be partially concealed or exposed according to the position of the first body 100 relative to the second body 200. In the following description, the part that is not concealed by the second body 200 is referred to as the first section 401, and the part that can optionally be concealed by the second body is referred to as the second section 402.

The door unit 400, as shown in FIGS. 5D, 6A, 6B, 6C and 6D, comprises a door frame 410 attached to the entrance of the battery compartment 303, a door member 420, one side of which is rotatably attached to the door frame 410, and a door locking unit 430 which locks the other side of the door member 420 to the door frame 410.

The door frame 410 is attached to the first sliding member 310 facing the entrance of the battery compartment 303 and the recording medium mount unit 331. In order to achieve this, the door frame 410 comprises fastening units 411 and 412 attached to the second fastening units 316a and 316b of the first sliding member 310, respectively. The fasteners 411 and 412 may have screw holes through which screws can be attached.

Also, the door frame 410 has a battery port 413 through which batteries can be inserted into and removed from the battery compartment 303, and a recording medium port 414 through which recording media can be inserted or removed. The battery port 413 and the recording media port 414 are disposed next to each other, and both the battery port 413 and the recording media port 414 can be opened and closed by the door member 420.

Also, a shaft 415 is provided on the first part of the door frame 410, which supports a support pin 422, which rotatably supports the door member 420.

An accommodating unit 416 is disposed on the second part of the door frame 410 in order to mount the door locking unit 430, and a plurality of fused bosses 416a protrude from the outer surface of the accommodating unit 416.

The curtain unit 600 described above is movably supported on the first lengthwise beam 417 of the door frame 410, and a stopper 417a, a pair of guide ribs 417b and 417c, and a guide hole 417d, are formed on the first lengthwise beam 417 in order to support the curtain unit 600. Additionally, a guide hole 417e for guiding the curtain unit 600 is disposed lengthwise on the rear of the door frame 410.

Figure 6A:
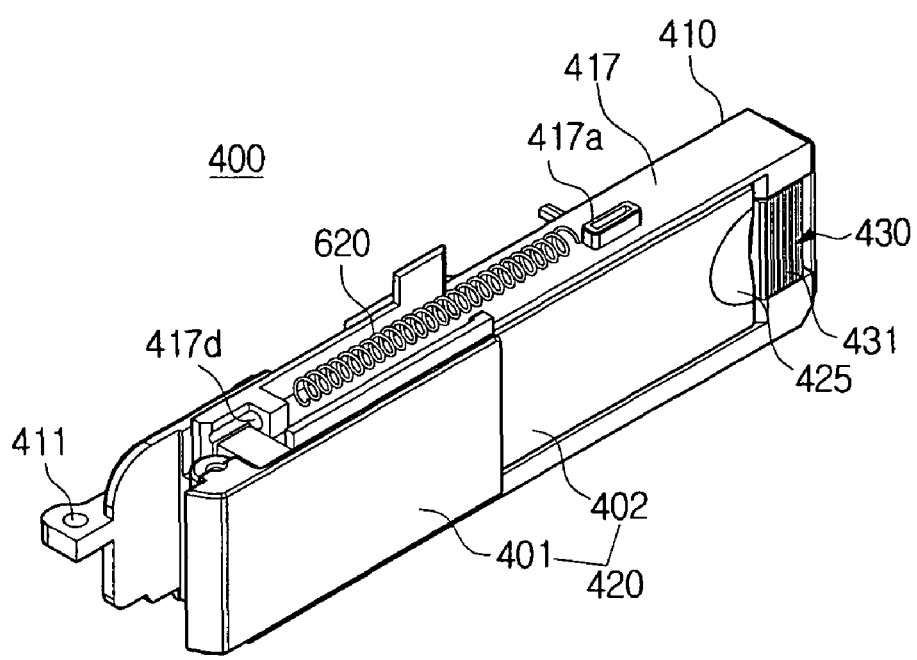
FIG. 6A is a perspective view illustrating a state in which the door unit of FIG. 5A is attached according to exemplary embodiments of the present invention.
Figure 6B:
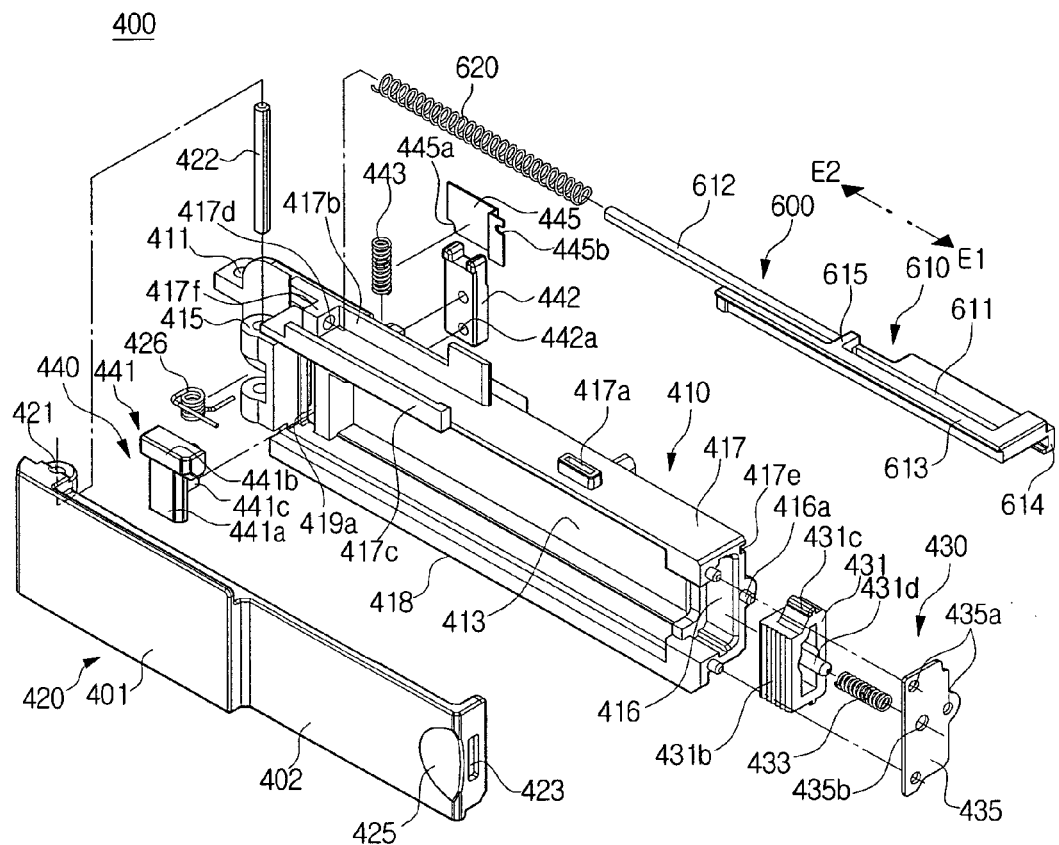
FIG. 6B is an exploded perspective view of a door unit in FIG. 6A according to exemplary embodiments of the present invention.
Figure 6C:
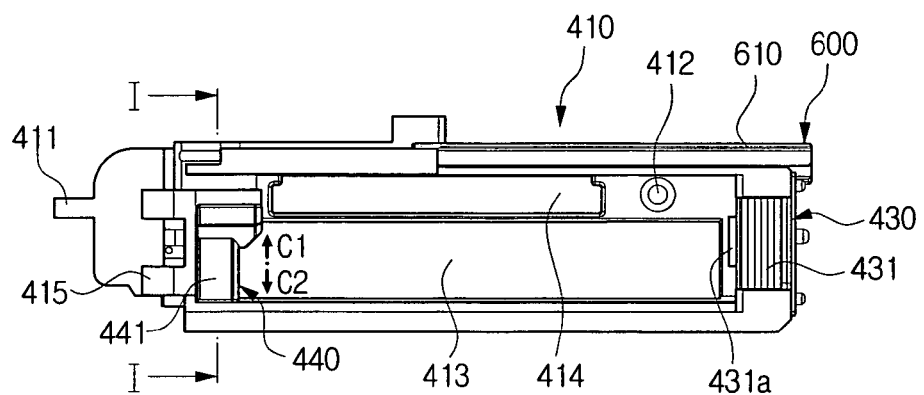
FIG. 6C is a plane view of a door frame shown in FIG. 6B according to exemplary embodiments of the present invention.
Figure 6D:
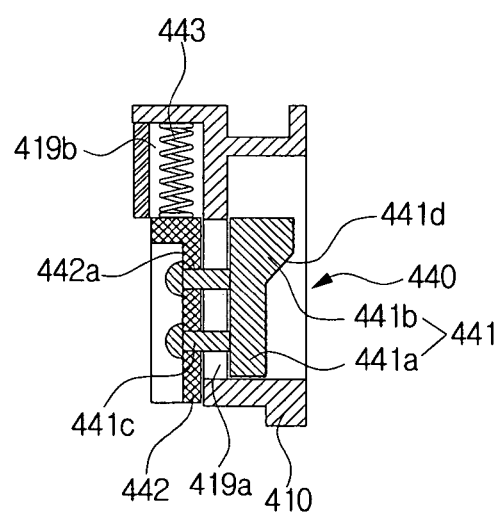
FIG. 6D is a sectional view cut along line I-I in FIG. 6C according to exemplary embodiments of the present invention.

A battery locking unit 440, which partially blocks off the battery port 413 and prevents the battery 500 inserted in the battery compartment 303 from falling out, is also disposed on the door frame 410. Slits 419a, as shown in FIGS. 6B, 6C, and 6D, which support the sliding movement of the battery locking unit 440, are provided on one side of the battery port 413.

The door member 420 comprises a hinge 421 by which the support pin 422 is attached to one side of the door. Also, a locking hole 423 is formed on the second part of the door member 420, which locks the other side of the door member 420 to the door locking unit 430. Additionally, on the outer surface adjacent to the second side of the door member 420, a hole, indent or recess 425 is formed so that a user can easily operate the door locking unit 430 with his or her finger. A door member 420 with this kind of composition is divided lengthwise into a first section 401 and a second section 402. The first section 401 protrudes further in the direction towards which the door member 420 opens than the second section. That is, the first section 401 of the door member 420 has roughly the same height as the outside of the surrounding first and second bodies 100 and 200, and the second section 402 is indented, stepped and/or recessed more relative to the first and second bodies 100 and 200.

Consequently, when the first and second bodies 100 and 200 move to the first position, the second section 402 moves to a position on the inside of the door cover 201 of the second body 200, and can be concealed from view.

A door member 420 having this exemplary structure can be made of plastic or metal, but is not limited thereto. It is desirable that it be made of aluminum alloy, which is both lightweight and strong. Also, the first section 401 and the second section 402 can have the same thickness, but they can have a stepped form provided by curving at the boundary area, and can have different thicknesses.

Moreover, the door member 420 can be kept closed by the door locking unit 430, and can be made to automatically open when the door locking unit 430 is unlocked. In order that the door locking unit 430 may be opened automatically, a spring, such as a torsion spring 426 can be installed on the support pin 422. While the torsion spring 426 is compressed, one end is attached to the door frame 410, and the other end is attached to the door member 420. The torsion spring 426 is compressed when the door member 420 is closed. When the door locking unit 430 is unlocked, the door member 420 can automatically open to roughly 900 relative to the door frame 410 due to the potential energy of the torsion spring 426.

The door locking unit 430 comprises a locking knob 431, a pressurized spring 433 and a support bracket 435. The locking knob 431 is movably accommodated on the accommodating unit 416 on the door frame 410. A locking projection 431*a* is disposed on the locking knob 431, and is attached by a lock to the locking knob 431. Projections 431*b* are disposed on the outside surface of the locking knob 431 to prevent sliding. A guide rib 431*c* is also formed on both sides of the locking knob 431 to guide the movement of the locking knob 431 from the accommodating unit 416, and a support pole 431*d* which supports the pressurized spring 433 protrudes from the top of the locking knob 431.

The pressurized spring 433 is installed between the locking knob 431 and the support bracket 435, and provides pressure in order to keep the door locking unit 430 locked by pressing the locking knob 431 against the door member 420.

The support bracket 435 is attached to the second long beam 418 of the door frame 410 in order to prevent the locking knob 431 and the pressure spring 433 becoming removed from the accommodation unit 416. This support bracket 435 comprises fastening holes 435*a* into which the fused bosses 416*a* on the door frame 410 are inserted, and a guide hole 435*b* through which the support pole 431*d* is guided. If the fused bosses 416*a* are inserted into the fastening holes 435*a*, the support bracket 435 can be fixed to the door frame 410 by heating the fused bosses 416*a* and fusing the fused bosses 416*a* onto the outside of the support bracket 435.

The door unit 400 further comprises the battery locking unit 440 which prevents the battery 500 inserted in the battery compartment 303 from falling out through the battery port 413 when the door member 410 is open.

The battery locking unit 440 as described above rotates to one side of the battery port 413. Additionally the battery locking unit 440 remains covered by the door member 420, and is installed so as to be able to move only if the door member 420 is open. This kind of battery locking unit 440, as shown in FIGS. 5D, 6B, 6C and 6D, comprises a battery locking knob 441, an operating member 442, a pressurized spring 443, and a support part 445.

The battery locking knob 441 is installed so as to be externally visible when the door member 420 is opened. The battery locking knob 441 comprises a slide unit 441*a* and a locking head unit 441*b*. Fusing projections 441*c* protrude from the rear of the slide unit 441*a*. The fusing projections 441*c* are inserted and fused in fusing holes 442*a*, which are formed on the operating member 442, and are placed between the slits 419*a* formed by the battery locking knob 441 and the operating member 442 on the door frame 410, and are attached at predetermined intervals on the door frame 410. Additionally, the fusing projections 441*c* are guided along the slits 419*a*, and can thereby move in a sliding motion between the position in which the battery locking knob 441 and the operating member 442 cover the battery entrance 413, and the position in which the battery entrance 413 is uncovered.

The locking head unit 441*b* is enlarged at one end of the slide unit 441*a*, and the enlarged section, as shown in FIG. 6C, covers the edge of the battery port 413. Additionally, a cam face 441*d* is formed on the locking head unit 441*b*. As the cam face 441*d* has an inclined surface, the locking head part 441*b* is able to be removed from the battery port 413 despite being pushed in by the edge of the battery 500 which is inserted through the battery port 413. Also, the enlarged locking head unit 441*b* forms a stepped profile with the slide unit 441*a*, so that the locking head unit 441*b* protrudes further outwards than the slide unit 441*a*. Consequently, if the user pushes the locking head unit 441*b* with his or her fingertips in direction C1, the battery locking knob 441 is removed from the battery port 413, and the battery 500 inserted in the battery compartment 303 can be removed.

The pressurized spring 443 presses the battery locking knob 441 and the operating member 442 in direction C2. Consequently, the battery locking unit 441 and the operating member 442 can be returned to the locked position, in which the battery port 413 is blocked off and the battery 500 is prevented from falling out. The pressurized spring 443 is accommodated in a spring accommodation hole 419*b* on the back of the door frame 410. Also, the pressurized spring 443 is supported by the support part 445 attached in order to cover the accommodating hole 419*b* on the rear of the door frame 410, and can be prevented from falling out. The support part 445 can be made of metal and is shaped like a plate. The support part 445 can be attached to the rear of the door frame 410 using glue or similar adhesive material. A plurality of fusing projections (not shown) are also formed on the rear of the door frame 410, so if the plurality of fusing projections are inserted in fusing holes 445*a* and 445*b* on the support part 445, the support part 445 can be fixed to the door frame 410 by being fused by the fusing projections.

The battery locking unit 440 is disposed on the door unit 400 as described above, but because it is installed so as to be concealed by the door member 420, a separate space for installation is not required. Further, since the battery locking unit 440 is not externally visible, the battery 500 can be prevented from falling out while the camera is being used or handled. Also, as the battery locking unit 440 is not externally visible, the external appearance of the camera can be improved.

Figure 7A:
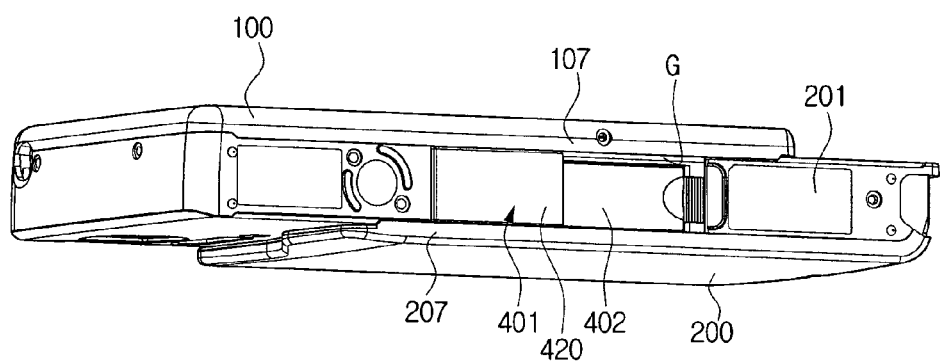
FIG. 7A is a drawing illustrating a state in which a curtain unit of FIG. 3A is pulled back according to exemplary embodiments of the present invention.

The first section 401 and the second section 402 of the door member 420 in the door unit 400 as described above are formed with a stepped profile on the outside. Therefore, if the first and second bodies 100 and 200 move to the second position, a gap G arises between the first body 100 and the door member 420 which is as deep as the step of the second section 402 is indented relative to the first section, as shown in FIG. 7A, while the second section, that is, the originally-concealed section is exposed. In other words, if the door cover unit 201 is disposed on a surface roughly level with the first section 401 of the door member 420, a gap G arises if the door cover unit is removed from the second section 402 due to having a structure which covers the second section 402 with the door cover section. If a fixed component is installed so as to cover gap G, which is necessary to expand the operating space of the holding unit 203 of the second body 200, it becomes impossible to move the holding unit 203. As a result, it is difficult to achieve the sliding movement of the first and second bodies 100 and 200. By contrast, the second long beam 418 (referring to FIG. 6B) of the door frame is attached adhesively to the inside of the first body 100, so a gap does not arise on the side of the second long beam 418. Moreover, an externally visible gap does not arise at the boundary between the first and second bodies 100 and 200, since extension ribs 107 and 207 extend the outer casing of the first and second bodies 100 and 200, respectively, so as to overlap each other.

However, dust or foreign bodies can enter through the gap G which arises in the manner described above. Further, taking deficiencies in the external composition into consideration, exemplary embodiments of the present invention can further comprise the curtain unit 600 which covers the gap G. FIG. 7A is a drawing illustrating an exemplary state in which the curtain unit 600 described below is omitted.

The curtain unit 600, as shown in FIGS. 6A, 6B, 7B and 7C, comprises a curtain member 610 and a curtain spring 620.

The curtain member 610 is slidably installed between the first body 100 and the door unit 400. To be more specific, the curtain member 610 is installed so as to slide back and forth on a predetermined path along the first long beam 417 of the door frame 410.

The stopper 417a disposed on the first long beam 417 is inserted into the curtain member 610, whereby the curtain member 610 is guided in its sliding movement. The curtain member 610 comprises a guide slit 611 which limits the sliding movement of the curtain member 610. The curtain member 610 also comprises a guide rod 612, which movably supports the curtain spring 620, a curtain unit 613 and a guide rib 614. The guide rod 612 has a predetermined length, and is inserted in a guide hole 417d formed on the door frame 410 if the curtain spring 620 is inserted in the guide rod 612. When the curtain member 610 moves, the guide rod 612 is guided into the guide hole 417d. Also, if the curtain spring 620 is inserted over the guide rod 612, one end of the curtain spring 620 is supported by the first stopper 417f formed in the guide hole 417d, and the other end of the curtain spring 620 is supported by the second stopper 615 disposed on the curtain member 610. Therefore, even if the curtain member 610 moves in direction E2 due to the force of the curtain member, if the external force is reduced, the curtain is pushed in direction E1 by the curtain spring 620 and returns to the original position.

The curtain unit 613 is disposed at a height corresponding to the height of the guide rib 417c of the door frame 410, and the curtain unit 613 follows the guide ribs 417c. When the curtain member 610 moves back towards E1 and is in its original position, the curtain unit 613 performs the function of substantially covering the gap G. Therefore, the length of the curtain unit 613 may be similar to or longer than the second section 402 of the door member 420.

Additionally, the guide ribs 614 are curved in a predetermined shape so as to be guided in order to be mated with the guide hole 417e disposed on the rear of the door frame 410.

According to this exemplary structure, the curtain member 610 is interposed between the door frame 410 and the first body 100, and while sliding back and forth on top of the door frame 410, can selectively hide the gap G while changing positions according to the relative position of the first and second bodies 100 and 200. Specifically, if the first and second bodies 100 and 200 move toward the second position, the curtain member 610 is completely pushed in the direction of E1 by the spring power of the curtain spring 620, and hides the gap G described above by moving from point D1 to D2. Even if the second body 200 moves further in the direction of E1 to the extent of the distance between points D2 and D3, the curtain member 610 preferably moves only as far as point D2 at the furthest point of travel due to the stopper 417a described above. If the first and second bodies 100 and 200 move in this manner to the second position, the second section 402 of the door member 420 is visible, and the door member 420 can open and shut. Also, the gap G is covered by the sliding movement of the curtain member 610 in the direction of E1.

Figure 7B:
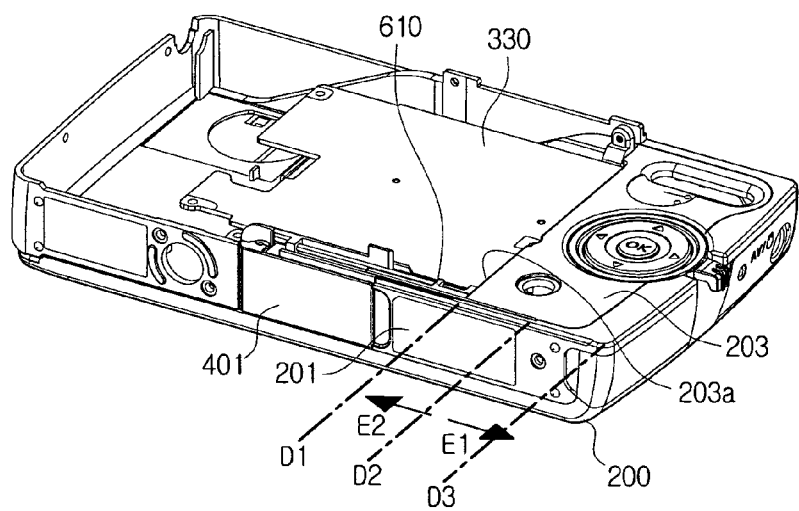
FIGS. 7B and 7C are perspective views illustrating an exemplary operation of the curtain unit according to exemplary embodiments of the present invention.
Figure 7C:
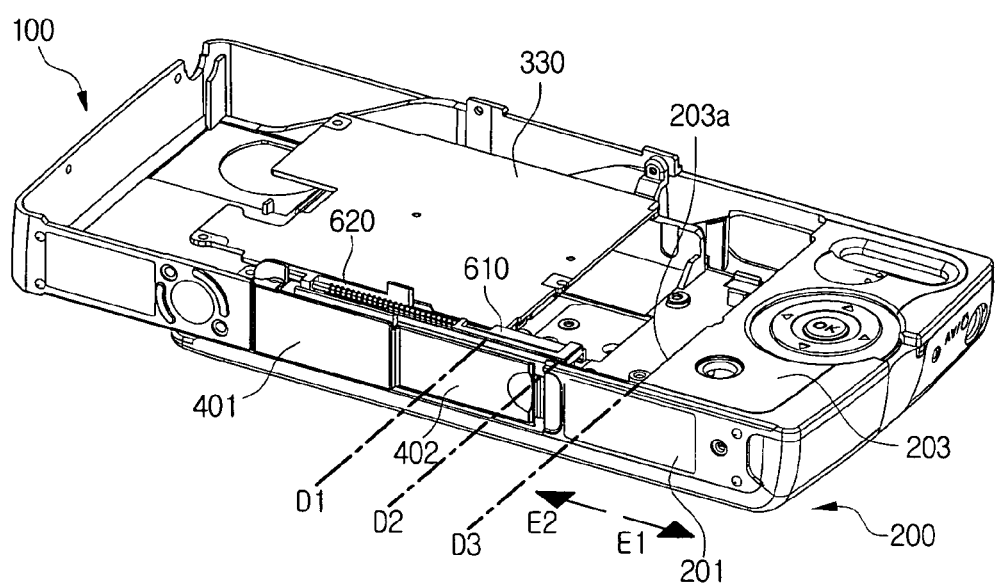

In contrast, the second body 200 moves in the direction of E2 when moved to the first position, as shown in FIG. 7C. When the second body 200 moves in the direction of E2, the side 203a of the holding unit 203 on which a button member 210 of the second body 200 is disposed, moves to position D2, and then pushes the curtain member 610 from point D2 in the direction of E2. Also, if the first and second bodies 100 and 200 as shown in FIG. 7B move completely to the first position, the curtain member 610 moves completely from point D2 to D1. In this state the curtain spring 620 is pushed in the direction of E1 due to being in a pressurized state. In this manner, when the second body 200 moves to the second position, the curtain member 610 automatically moves to point D2 due to the pressure of the curtain spring 620 and is able to cover the gap G as shown in FIG. 7A.

An exemplary method of using a camera according to an embodiment of the present invention is described in greater detail below.

FIGS. 2A and 2B are perspective views showing a state prior to movement in a camera according to an exemplary embodiment of the present invention, and FIGS. 3A and 3B show a state after movement. In order to show still images and moving images, if the push unit of the first body 100 is pushed to the left of the illustrated state shown in FIGS. 2A and 2B (the first position), the first body 100 and the second body 200 move to the second position due to the operation of the internal slide unit 300, as shown in FIGS. 3A and 3B.

Accordingly, an image can be captured while the lens 110, which was covered by the second body 200, together with the holding unit 203 of the second body 200 and the various operating buttons 210 on the holding unit 203, which were concealed by the first body 100, are made externally visible.

Moreover, the second section 402 of the door unit 400 that was concealed by the door cover unit 201 of the second body 200 is externally visible. Therefore, if the first and second bodies 100 and 200 move to the second position in this manner, and if the user properly holds the camera using the holding unit 203 while operating the various operating buttons 210 on the holding unit 203, an image can be captured. Also, as shown in FIG. 4, where the door member 420 is opened, the battery 500 and/or the recording medium can be changed. The action of opening and closing the door member 420, and the action of removing the battery 500 have been described in detail above, so further description of these actions is omitted below. Also, the action of inserting a recording media is typically comprised of actions involving inserting and/or removing the recording media while the door unit 400 is open, so further description of these actions are also omitted.

Moreover, in the state shown in FIGS. 3A and 3B, the curtain member 610 shown in FIG. 7C covers the gap G between the door unit 400 and the first body 100, by being pushed automatically to point D3 by the curtain spring 620. Therefore, even when in the second position, the outward appearance of the product is improved, and dust and foreign bodies can be prevented from entering the product.

Exemplary embodiments of the present invention can be constructed such that modes can be automatically selected in response to body movements, for example, the image capture mode can be automatically selected when the first body 100 and the second body 200 move to the second position, as described above.

Of course, other functions can be used to change the device from the image capture mode to a different mode.

If the first body 100 and the second body 200 are moved to the first position after capturing an image, and the lens 110 of the first body 100 and the operating buttons 210 of the second body are concealed, as shown in FIGS. 2A and 2B, the camera becomes more compact and portable. Also, the second section 402 of the door unit 400 becomes covered by the door cover unit 201 of the second body, and the curtain member 610 is pushed to the end 230a of the holding unit 203 of the second body 200 as shown in FIG. 7B, and by moving the curtain member 610 towards point D1, space is made available for moving the holding unit 203.

Since functions such as Digital Media Broadcasting do not require a separate grip unit, if the camera is held appropriately, the broadcast can be viewed on the display screen and thereby illustrating an example of a mode other than the capture mode.

The present invention has been described using a number of exemplary embodiments. The terms used herein have been provided for the purpose of explanation and should not be interpreted as limiting the scope of the invention. Any number of modifications and changes can be made within the scope of the above description. Therefore, the present invention can be freely implemented within the scope of the claims to the extent that each part is not described separately.

According to embodiments of the present invention as described above, the display screen 120 on the first body can be enlarged even though the camera is compact, as the operating buttons 210 and grip unit are formed on the second body 200, which does not have the display screen.

Additionally, it is possible to provide a multi-function digital camera which is convenient to use, having both a safe grip and a large display screen.

According to embodiments of the present invention, a product can be provided which satisfies the demands of consumers.

Moreover, by providing a battery door unit which is concealed or made externally visible by the sliding movement of the first and second bodies, the door unit can be made compact. Further, by also making it possible to conceal the door unit, the design of the apparatus can also be improved.

In addition, dust and foreign bodies can be blocked from entering the gap that arises when the door unit is made externally visible due to the movement of the first and second bodies, by providing a curtain unit to cover the gap which arises in the space between the door unit and the first body in which the second body moves, and further improving the external appearance of the device.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A portable electronic device, comprising:
   a first body, which has a display screen;
   a second body, which is slidably attached to the first body; and
   a door unit attached to the first body, which is configured to open and shut a battery compartment provided between the first and second bodies,
   wherein the door unit is partially concealed or made externally visible according to a direction in which at least one of the first and second bodies move.

2. The portable electronic device according to claim 1, wherein the battery compartment and the door unit are configured to move with a sliding motion of the first body along the second body.

3. The portable electronic device according to claim 2, wherein the door unit is configured to be partially concealed by the second body when at least one of the first and second bodies move.

4. The portable electronic device according to claim 1, further comprising:
   a lens disposed on the first body, the lens being configured to be concealed and made externally visible by the movement of the second body along the first body.

5. The portable electronic device according to claim 1, wherein the door unit comprises:
   a door frame, comprising a battery entrance on an entrance side of the battery compartment and through which a battery can be passed;
   a door member, which is rotatably installed on the door frame, and which is configured to open and close the battery entrance port; and
   a door locking unit, which is disposed on the door frame and which is configured to lock the door member when the door member is closed.

6. The portable electronic device according to claim 5, wherein the door unit further comprises:
   a spring, which is configured to automatically open the door member on the door locking unit when unlocked.

7. The portable electronic device according to claim 5, in which the door locking unit comprises:
   a locking knob, movably disposed on the door frame and which is configured to secure the door member when the door member is closed;
   a pressure spring, which is configured to press the locking knob into the door member; and
   a support bracket, installed on the door frame and which is configured to movably support the pressure spring and the locking knob.

8. The portable electronic device according to claim 5, wherein the door member comprises:
   a first section, which is configured to remain externally visible; and
   a second section, which is configured to become concealed or made externally visible by the movement of the second body,
   wherein the second section is thinner than the first section.

9. The portable electronic device according to claim 8, wherein a surface of the second section of the door member is indented relative to a surrounding surface of the first body.

10. The portable electronic device according to claim 8, wherein the first section of the door member comprises a height corresponding to an outer surface of the second section of the second body.

11. The portable electronic device according to claim 5, wherein the door unit further comprises:
    a battery locking unit which is configured to prevent an inserted battery from moving relative to the battery compartment.

12. The portable electronic device according to claim 11, wherein the battery locking unit comprises:
    a battery locking knob movably installed on the door frame, which is configured to cover the battery entrance according to a position of at least one of the first and second bodies, and which is configured to prevent a battery inserted in the battery compartment from escaping the battery compartment; and
    a pressurized spring for pressing the battery locking knob into a position covering the battery port.

13. The portable electronic device according to claim 12, wherein the battery locking unit further comprises:
    an operating member which is configured to slidably support the battery locking knob on the door frame; and
    a support part for supporting the pressurized spring and which is configured to prevent escape of the pressurized spring.

14. The portable electronic device according to claim 12, wherein the battery locking unit is configured to be concealed or made externally visible by movement of the door member.

15. The portable electronic device according to claim 5, further comprising:
    a recording media mount unit disposed between the first and second bodies; and
    a recording media port through which a recording media mounted on the recording media mount unit can be installed or removed, and which is configured to be opened and closed by the door member.

16. The portable electronic device according to claim 1, further comprising:
a curtain unit, which is configured to cover a gap between the first body and the concealed section of the second body when the section which had been concealed is made visible by the movement of the second body.

17. The portable electronic device according to claim 16, wherein the curtain unit comprises:
a curtain member, slidably installed between the first body and the door unit; and
a curtain spring, which is configured to move the curtain member to a location covering the gap when the concealed section of the first body becomes visible,
wherein the curtain member is configured to be pushed onto the second body, which moves in order to cover the concealed section, and return to the initial location.

18. The portable electronic device according to claim 17, wherein the curtain member is slidably supported to slide back and forth along the door unit.

19. The portable electronic device according to claim 16, further comprising:
a slide unit having a battery compartment, slidably connecting the first body and the second body.

20. The portable electronic device according to claim 19, wherein the slide unit comprises:
a first sliding member attached to the first body; and
a second sliding member attached to the second body and slidably attached to the first sliding member,
wherein the battery compartment is disposed on the first sliding member.

21. The portable electronic device according to claim 1, further comprising:
a slide unit slidably attaching the first body to the second body, and including the battery compartment.

22. The portable electronic device according to claim 21, in which the slide unit further comprises:
a first sliding member attached to the first body; and
a second sliding member attached to the second body and slidably attached to the first sliding member,
wherein the battery compartment is disposed on the first sliding member.

23. The portable electronic device according to claim 1, further comprising:
a lens disposed on the first body; and
a plurality of operating buttons disposed on the second body.

24. The portable electronic device according to claim 23, wherein the lens and operating buttons are configured to be concealed or made externally visible when the second body moves relative to the first body.

* * * * *